United States Patent
Holmes

(10) Patent No.: US 8,414,436 B2
(45) Date of Patent: Apr. 9, 2013

(54) HYBRID POWERTRAIN AND METHOD OF OPERATING SAME

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 714 days.

(21) Appl. No.: 12/433,480

(22) Filed: Apr. 30, 2009

(65) Prior Publication Data

US 2010/0279817 A1 Nov. 4, 2010

(51) Int. Cl.
*F16H 3/72* (2006.01)
*F16H 37/06* (2006.01)

(52) U.S. Cl. ............. 475/5; 180/65.23; 180/65.235

(58) Field of Classification Search ... 475/5; 180/65.22, 180/65.226, 65.23, 65.235, 65.24, 65.275, 180/65.6, 65.7
See application file for complete search history.

(56) References Cited

U.S. PATENT DOCUMENTS

| | | |
|---|---|---|
| 6,953,409 B2 | 10/2005 | Schmidt et al. |
| 7,101,309 B2 | 9/2006 | Ozeki et al. |
| 2004/0249524 A1 | 12/2004 | Ozeki |
| 2007/0111837 A1 * | 5/2007 | Raghavan et al. ............. 475/5 |
| 2008/0125264 A1 * | 5/2008 | Conlon et al. ................ 475/5 |
| 2008/0207374 A1 | 8/2008 | Iwanaka et al. |

FOREIGN PATENT DOCUMENTS

| | | |
|---|---|---|
| JP | 11227476 A | 8/1999 |
| JP | 2000016101 A | 1/2000 |
| JP | 2000142138 A | 5/2000 |
| JP | 2004364432 A | 12/2004 |
| JP | 2005199942 A | 7/2005 |
| JP | 2005291476 A | 10/2005 |
| JP | 3807386 B2 | 8/2006 |
| JP | 2006283917 A | 10/2006 |
| JP | 2007045684 A | 2/2007 |

* cited by examiner

*Primary Examiner* — Hau Phan
*Assistant Examiner* — Bryan Evans
(74) *Attorney, Agent, or Firm* — Quinn Law Goup, PLLC

(57) ABSTRACT

A method of operating a hybrid powertrain is provided that permits operation in multiple fixed ratio modes appropriate for towing and other vehicle operating conditions in which relatively high output torque is required. The method includes establishing three different electrically-variable operating modes by engaging different torque-transmitting mechanisms in response to different respective vehicle operating conditions. The method further includes establishing at least two different fixed ratio modes by engaging another torque-transmitting mechanism in addition to the respective different torque-transmitting mechanisms engaged to establish the electrically-variable operating modes. A hybrid powertrain having a controller configured to control the powertrain to operate according to the method is also provided.

13 Claims, 4 Drawing Sheets

| Mode | 172 | 174 | 176 | 170 |
|---|---|---|---|---|
| EVT-1 | | X | | |
| EVT-2 | X | | | |
| EVT-3 | | | X | |
| FIXED 1 | | X | | X |
| FIXED 2 | X | | | X |
| FIXED 3 | | | X | X |

| Mode | 72 | 74 | 76 | 70 |
|---|---|---|---|---|
| EVT-1 | | | X | |
| EVT-2 | X | | | |
| EVT-3 | | X | | |
| FIXED 1 | | | X | X |
| FIXED 2 | X | | | X |
| FIXED 3 | | X | | X |

| Mode | 172 | 174 | 176 | 170 |
|---|---|---|---|---|
| EVT-1 |  | X |  |  |
| EVT-2 | X |  |  |  |
| EVT-3 |  |  | X |  |
| FIXED 1 |  | X |  | X |
| FIXED 2 | X |  |  | X |
| FIXED 3 |  |  | X | X |

| Mode | 272 | 276 | 274 | 270 |
|---|---|---|---|---|
| EVT-1 | X | | X | |
| EVT-2 | X | X | | |
| EVT-3 | | X | X | |
| FIXED 1 | X | | X | X |
| FIXED 2 | X | X | | X |
| FIXED 3 | | X | X | X |

HYBRID POWERTRAIN AND METHOD OF OPERATING SAME

TECHNICAL FIELD

The invention relates to a hybrid powertrain with multiple fixed speed ratios and a method of operating the same.

BACKGROUND OF THE INVENTION

Hybrid powertrains may improve vehicle fuel economy in a variety of ways. For instance, in some hybrid powertrains, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods. Transient demand for engine torque or power is supplemented by the motor/generators during operation in engine-on, electrically variable modes, allowing for downsizing the engine without reducing apparent vehicle performance. Additionally, the engine may be operated at or near the optimal efficiency point for a given power demand. The motor/generators are able to capture vehicle kinetic energy during braking, which is used to keep the engine off longer, supplement engine torque or power and/or operate at a lower engine speed, or supplement accessory power supplies. Additionally, the motor/generators are very efficient in accessory power generation and electric power from the battery serves as an available torque reserve allowing operation at a relatively low transmission numerical speed ratio. The hybrid powertrain must be designed to perform when vehicle operating conditions require high output torque. Relying on torque from the motor/generators to do so may necessitate the use of relatively large motor/generators and/or a large energy storage device.

SUMMARY OF THE INVENTION

A method of operating a hybrid powertrain is provided that permits operation in multiple fixed ratio modes appropriate for towing and other vehicle operating conditions in which relatively high output torque is required. By providing fixed ratio modes, the motor/generators need not be sized to provide the high output torque required, thus potentially reducing cost and packaging space requirements. The method applies to a hybrid powertrain that includes an engine and a transmission. The transmission has an input member connected with the engine, an output member, a stationary member, a first and a second motor/generator, a first planetary gearing arrangement, and a second planetary gearing arrangement. The input member is connected for rotation with a first member of the first planetary gearing arrangement. The output member is connected for rotation with a first member of the second planetary gearing arrangement. The first motor/generator is connected for rotation with a second member of the first planetary gearing arrangement. The second motor/generator is connected for rotation with a second member of the second planetary gearing arrangement. An interconnecting member connects a third member of the first planetary gearing arrangement for common rotation with a third member of the second planetary gearing arrangement. A plurality of torque-transmitting mechanisms are provided, including a first torque-transmitting mechanism selectively engagable to ground the first motor/generator to the stationary member, a second torque-transmitting mechanism selectively engagable to connect the interconnecting member for rotation with the output member, a third torque-transmitting mechanism and a fourth torque-transmitting mechanism. The third and fourth torque-transmitting mechanisms are selectively engagable to connect different members of the second planetary gearing arrangement to the stationary member or for common rotation with one another.

The method includes establishing three different electrically-variable operating modes by engaging different ones of the second, third and fourth torque-transmitting mechanisms in response to different respective vehicle operating conditions. The method further includes establishing at least two different fixed ratio modes by engaging the first torque-transmitting mechanism in addition to the respective different ones of the second, third and fourth torque-transmitting mechanisms engaged to establish the electrically-variable operating modes. The at least two different fixed ratio modes are established in response to different respective vehicle operating conditions requiring greater torque at the output member than the respective different vehicle operating conditions of the electrically-variable operating modes.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
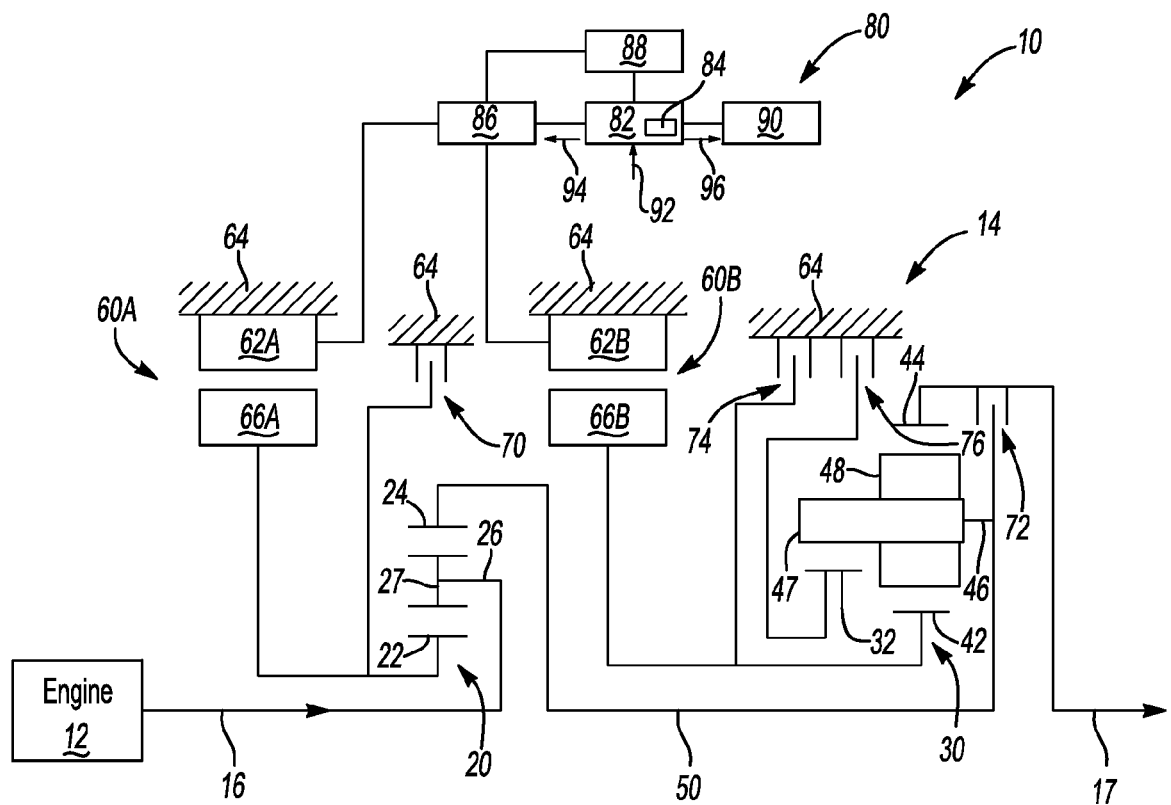
FIG. 1 is a schematic illustration of a first embodiment of a powertrain with a hybrid transmission.
FIG. 2 is a chart showing an engagement schedule of torque-transmitting mechanisms of the transmission of FIG. 1 to establish various different operating modes.

Referring to the drawings, wherein like reference numbers refer to like components throughout the several views, FIG. 1 shows a hybrid powertrain 10 with an engine 12 connected with a hybrid transmission 14. The engine 12 has an output member, such as a crankshaft, connected for driving an input member 16 of the transmission 14, which may be via a damping mechanism, a torque converter, or other known connection.

The transmission 14 includes a first planetary gearing arrangement 20 and a second planetary gearing arrangement 30. The first planetary gearing arrangement 20 is a simple planetary gear set having a sun gear member 22, a ring gear member 24, and a carrier member 26 rotatably supporting a plurality of pinion gears 27 that mesh with both the sun gear member 22 and the ring gear member 24.

The second planetary gearing arrangement 30 is a compound planetary gear set having a first sun gear member 32, a second sun gear member 42, a single carrier member 46 rotatably supporting two sets of pinion gears 47 and 48, and a ring gear member 44. Pinion gears 47 are long pinions and mesh with sun gear member 32 and with the pinion gears 48. Pinion gears 48 mesh with ring gear member 44. An interconnecting member 50 connects ring gear member 24 for common rotation with carrier member 46. Interconnecting member 50 may be one component, such as a hub, or several integral and commonly rotating components.

The transmission 14 includes a first motor/generator 60A and a second motor generator 60B. The first motor generator 60A includes a stator 62A grounded to a stationary member 64, such as a transmission casing. The stationary member 64 is considered stationary as it is a nonrotating member of the transmission 14. Motor/generator 60A also includes a rotor 66A configured to be rotatably driven when the stator 62A is energized, and configured to generate electrical energy in the stator 62A when the motor/generator 60A is controlled to operate as a generator. The rotor 66A is continuously connected for rotation with the sun gear member 22.

Similarly, the motor/generator 60B also includes a rotor 66B configured to be rotatably driven when the stator 62B is energized, and configured to generate electrical energy in the stator 62B when the motor/generator 60B is controlled to operate as a generator. The rotor 66B is continuously connected for rotation with the sun gear member 42.

The transmission 14 also includes selectively engagable torque-transmitting mechanisms, including a first torque-transmitting mechanism, brake 70, a second torque-transmitting mechanism, clutch 72, a third torque-transmitting mechanism, brake 74, and a fourth torque-transmitting mechanism, brake 76. The torque-transmitting mechanisms may be friction plate-type brakes and clutches engagable via hydraulic pressure, but are not limited to such. Brake 70 is selectively engagable to ground the rotor 66A of motor/generator 60A and the sun gear member 22 to the stationary member 64. Clutch 72 is selectively engagable to connect the interconnected carrier member 46 and ring gear member 24 for common rotation with ring gear member 44 and output member 17. Brake 74 is selectively engagable to ground the rotor 66B of motor/generator 60B and the sun gear member 42 to the stationary member 64. Brake 76 is selectively engagable to ground the sun gear member 32 to the stationary member 64.

The transmission 14 is controllable to operate in various operating modes according to vehicle operating conditions under the control of a control system 80. The control system 80 includes a controller 82 that includes electronics such as a processor 84 on which a control algorithm is stored. The controller 82 is operatively connected to a power inverter 86 by a transfer conductor. The power inverter 86 in turn communicates with an electric storage device 88 via a transfer conductor. The electric storage device 88 may be one or more batteries but will be referred to herein as a battery. Other electric storage devices that have the ability to store electric power and dispense electric power may be used in place of the batteries.

Transfer conductors allow the power inverter 86 to provide the stored electric power to the motor/generator 60A and/or the motor/generator 60B in a motor mode, or transfer electric power from the motor/generator 60A and/or the motor/generator 60B to the electric storage device 88 in a generator mode. Additionally, the controller 82 communicates with a valve body 90 via transfer conductors to control selective engagement or disengagement of torque-transmitting mechanisms 70, 72, 74, and 76, as described below, via hydraulic fluid pressure, as is understood by those skilled in the art. In alternative embodiments, the torque-transmitting mechanisms 70, 72, 74 and 76 may be actuated electrically or otherwise. Connection of the valve body 90 to the torque-transmitting mechanisms 70, 72, 74, 76 is by various fluid passages in the valve body 90 and stationary member 64. Selective engagement of the torque-transmitting mechanisms 70, 72, 74, and 76 along with control of the speed and torque of the motor/generators 60A, 60B and engine 12 determines the operating mode of the powertrain 10.

The controller 82 receives a plurality of input signals 92, such as sensor signals from sensors (not shown) positioned to monitor the operation of the engine 12, the input member 16, the output member 17, vehicle wheels (not shown), and/or input signals from a vehicle operator, such as accelerator position. The input signals 92 correspond with vehicle operating conditions. The processor 84 processes the input signals 92 according to the stored algorithm 84, and provides control signals 94, 96 along transfer conductors in response to the input signals 92, as well as control signals to control the engine 12. The control signals 94, 96 establish the operating mode of the powertrain 10.

Control signals 94 to the inverter 86 cause the inverter 86 to provide electrical current from the energy storage device 88 to one or both of the motor/generators 60A, 60B, or may cause electrical current from the stators 62A and/or 62B to be stored in the energy storage device 88. Control signals 96 to the valve body 90 control the movement of electro-hydraulic valves (not shown, but as are known to those skilled in the art) within the valve body 90 that regulate hydraulic pressure to the torque-transmitting mechanisms 70, 72, 74 and 76 to control engagement thereof. Control signals to the engine control the on/off status as well as speed of the engine 12.

FIG. 2 shows the engagement schedule of the torque-transmitting mechanisms 70, 72, 74 and 76 to establish six different operating modes of the powertrain 10 as shown. The engagement schedule for three electrically-variable operating modes, EVT-1, EVT-2, and EVT-3, as well as three fixed operating modes, Fixed 1, Fixed 2 and Fixed 3 is shown. Establishment of these six operating modes is according to the method 300 of FIG. 7, which is described below.

To establish the electrically-variable operating mode EVT-1, brake 76 is engaged, the engine 12 is on, motor/generator 60A is controlled to operate as a generator, motor/generator 60B controlled to operate as a motor, and torque is multiplied through the planetary gear set 30.

To establish the electrically-variable operating mode EVT-2, clutch 72 is engaged, the engine 12 is on, motor/generator 60A is controlled to operate as a generator, and motor/generator 60B is controlled to operate as a motor. Engagement of clutch 72 causes all elements of planetary gearing arrangement 30 to be locked together for rotation at the same speed as the interconnecting member 50 and the output member 17.

To establish the electrically-variable operating mode EVT-3, brake 74 is engaged, the engine 12 is on, and motor/generator 60B is controlled to operate as a generator, supplying electric power to energy storage device 88 through the control system 80. The stored power is supplied to motor/generator 60A, which is controlled to function as a motor.

The electrically-variable operating mode EVT-1 is appropriate for a range of relatively high-output torque, low vehicle speed operating conditions, the electrically-variable operating mode EVT-2 is appropriate for a range of relatively lower-output torque, higher vehicle speed operating conditions, and the electrically-variable operating mode EVT-3 is appropriate for even lower-output torque, higher vehicle speed operating conditions. Thus, the controller 82 may determine based on input signals 92 that vehicle operating conditions warrant shifting from EVT-1 to EVT-2 and then to EVT-3 as vehicle speed increases, and will send appropriate control signals 96 to the valve body 90 to establish such a succession of modes.

Input signals 92 received by the controller 82 and processed according to algorithm 84 may result in control signals 96 that implement one of the three available fixed ratio modes FIXED 1, FIXED 2, or FIXED 3. A fixed ratio operating mode is appropriate when output torque requirements increase momentarily, such as during vehicle acceleration or hill-climbing, or for a prolonged period, such as when the vehicle is used for towing. Acceleration or hill-climbing occurrences would be supplied to the controller via vehicle mounted sensors, such as torque sensors on the output member 17. The occurrence of towing may be indicated by a shift lever selected by the vehicle operator, or by torque sensors.

To establish the fixed ratio operating mode FIXED 1, brakes 70 and 76 are engaged. Thus, motor/generator 60A is grounded, and a fixed ratio is established. Motor/generator 60A is off. Motor/generator 60B is off and free-wheels at a rotational speed proportional to that of the engine 12. By grounding the sun gear member 32, torque is multiplied through the second planetary gearing arrangement 30 to the output member 17. The FIXED 1 mode may be established by engaging brake 70 during the electrically-variable EVT-1 mode, or may be established from vehicle rest. If vehicle operating conditions warrant during the fixed mode FIXED 1, motor/generator 60B may be controlled to operate as a generator for regenerative braking, or as a motor to add torque, thus establishing a simple parallel hybrid operating mode in which the speed of rotor 66B is proportional to the speed of the engine 12.

To establish the fixed ratio operating mode FIXED 2, brake 70 and clutch 72 are engaged. Thus, motor/generator 60A is grounded, and a fixed ratio is established. Motor/generator 60A is off. Motor/generator 60B is off and free-wheels at a rotational speed proportional to that of the engine 12. The FIXED 2 mode may be established by engaging brake 70 during the electrically-variable EVT-2 mode. If vehicle operating conditions warrant during the fixed mode FIXED 2, motor/generator 60B may be controlled to operate as a generator for regenerative braking, or as a motor to add torque, thus establishing a simple parallel hybrid operating mode in which the speed of rotor 66B is proportional to the speed of the engine 12.

To establish the fixed ratio operating mode FIXED 3, brakes 70 and 74 are engaged. Thus, both motor/generators 60A and 60B are off with rotors 66A, 66B stationary, and a fixed ratio is established. The FIXED 3 mode may be established by engaging brake 70 during the electrically-variable EVT-3 mode.

Accordingly, the method of controlling the hybrid powertrain 10 of FIG. 1 as described above is shown in FIG. 7 as method 300, which begins with block 302 in which the controller 82 determines vehicle operating conditions via input signals 92 processed by processor 84. Based on continually monitored vehicle operating conditions, the controller 82 controls the motor/generators 60A, 60B, and engagement of the clutches and brakes 70, 72, 74 and 76 according to the table of FIG. 2 to establish the appropriate operating mode. For example, from a cold start of the engine 12 and with the vehicle stationary, based on operating conditions, such as whether operator input indicates the vehicle is being used for towing, the controller 82 determines that either the first electrically-variable operating mode EVT-1 or the first fixed ratio mode FIXED 1 is appropriate, and proceeds to either box 304 or box 306, accordingly. For example, if the vehicle operating conditions indicate that the vehicle is being used for towing, the first fixed ratio mode would be appropriate.

Once in either the first fixed ratio mode FIXED 1 or the first electrically-variable operating mode EVT-1, the method 300 again proceeds to block 302, as the controller 82 continues to monitor vehicle operating conditions. Assuming vehicle operating conditions other than vehicle speed remain substantially the same, the method 300 will likely proceed from the first electrically-variable operating mode EVT-1 to block 308, establishing the second electrically-variable operating mode EVT-2 after vehicle speed reaches a predetermined speed, or return to block 304 to establish the first electrically-variable operating mode EVT-1 from the first fixed ratio mode FIXED 1 if the operating conditions warranting the fixed mode, such as uphill driving, have ceased, and vehicle speed is within a range appropriate for the first electrically-variable operating mode EVT-1. Alternatively, the method 300 could proceed from the first fixed ratio mode FIXED 1 established in block 306 to the second fixed ratio mode FIXED 2 established in block 310 if operating conditions, such as towing or uphill driving, warrant.

Whether in block 308 or block 310, the method 300 continues to determine current vehicle operating conditions in block 302, and, as vehicle speed increases, proceeds to establish either the third electrically variable operating mode EVT-3 in block 312, or the third fixed ratio mode FIXED 3 in block 314, by engaging the appropriate clutches and brakes as indicated in FIG. 2.

During any of the fixed ratio modes FIXED 1, FIXED 2 and FIXED 3, the controller 82 may determine that additional drive torque is needed, or that less torque is needed (e.g., regenerative braking), and move to block 316 in which the second motor/generator 60B is controlled to function as a motor, or as a generator, respectively. Functioning of the second motor/generator 60B as a generator slows the output member 17 and is referred to as regenerative braking. Controlling the second motor/generator 60B to function as a motor in such a manner establishes a simple parallel hybrid operating mode.

Second Embodiment

Figures 3, 4:
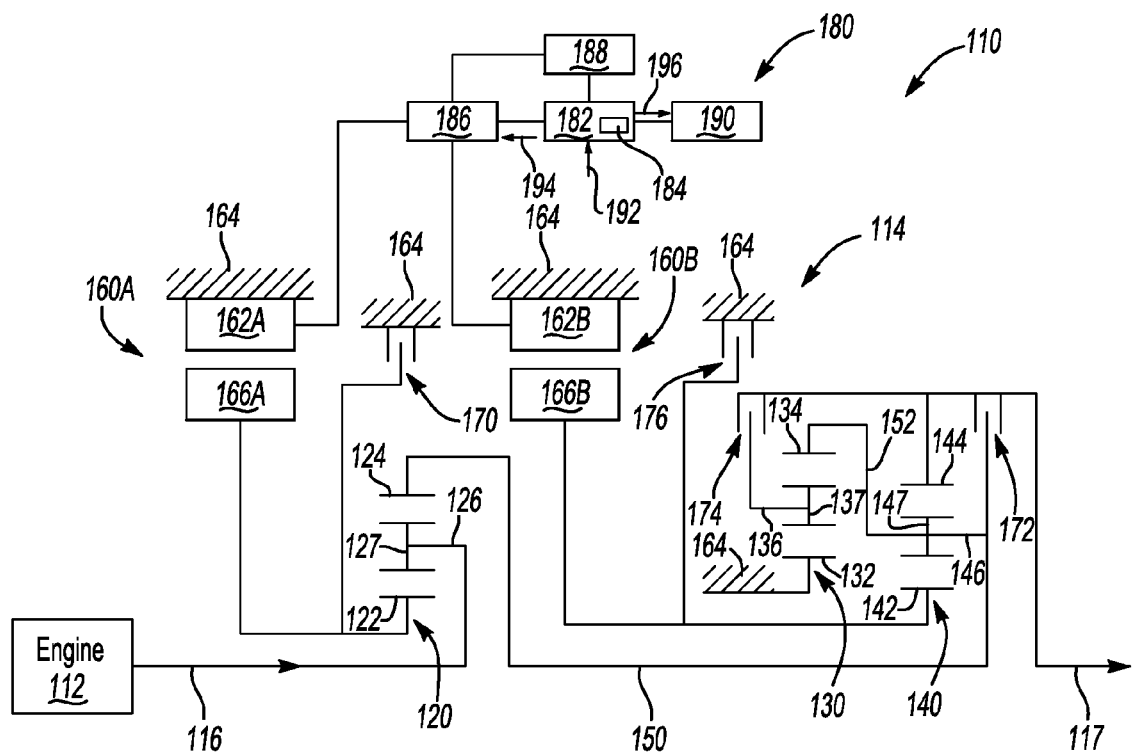
FIG. 3 is a schematic illustration of a second embodiment of a powertrain with a hybrid transmission.
FIG. 4 is a chart showing an engagement schedule of torque-transmitting mechanisms of the transmission of FIG. 3 to establish various different operating modes.

Referring to FIG. 3, another embodiment of a hybrid powertrain 110 has an engine 112 connected with a hybrid transmission 114. The engine 112 has an output member, such as a crankshaft, connected for driving an input member 116 of the transmission 114, which may be via a damping mechanism, a torque converter, or other known connection.

The transmission 114 includes a first planetary gearing arrangement 120, a second planetary gearing arrangement 130, and a third planetary gearing arrangement 140. The first planetary gearing arrangement 120 is a simple planetary gear set having a sun gear member 122, a ring gear member 124, and a carrier member 126 rotatably supporting a plurality of pinion gears 127 that mesh with both the sun gear member 122 and the ring gear member 124.

The second planetary gear set 130 is a simple planetary gear set having a sun gear member 132 grounded to a stationary member 164, a ring gear member 134, and a carrier member 136 rotatably supporting a plurality of pinion gears 137 that mesh with both the ring gear member 134 and the sun gear member 132.

The third planetary gear set 140 is a simple planetary gear set having a sun gear member 142, a ring gear member 144, and a carrier member 146 rotatably supporting a plurality of pinion gears 147 that mesh with both the ring gear member 144 and the sun gear member 142. An interconnecting member 150 connects ring gear member 124 for common rotation with carrier member 146. An interconnecting member 152 connects ring gear member 134 for common rotation with carrier member 146. Interconnecting members 150 and 152 may be integrated as one component, or may be several integral and commonly rotating components.

The transmission 114 includes a first motor/generator 160A and a second motor generator 160B. The first motor generator 160A includes a stator 162A grounded to stationary member 164, such as a transmission casing. The stationary member 164 is considered stationary as it is a nonrotating member of the transmission 114. Motor/generator 160A also includes a rotor 166A configured to be rotatably driven when the stator 162A is energized, and configured to generate electrical energy in the stator 162A when the motor/generator 160A is controlled to operate as a generator. The rotor 166A is continuously connected for rotation with the sun gear member 122.

Similarly, the motor/generator 160B also includes a rotor 166B configured to be rotatably driven when the stator 162B is energized, and configured to generate electrical energy in the stator 162B when the motor/generator 160B is controlled to operate as a generator. The rotor 166B is continuously connected for rotation with the sun gear member 142.

The transmission 114 also includes selectively engagable torque-transmitting mechanisms, including a first torque-transmitting mechanism, brake 170, a second torque-transmitting mechanism, clutch 172, a third torque-transmitting mechanism, clutch 174, and a fourth torque-transmitting mechanism, brake 176. The torque-transmitting mechanisms may be friction plate-type brakes and clutches engagable via hydraulic pressure, but are not limited to such. Brake 170 is selectively engagable to ground the rotor 166A of motor/generator 160A and the sun gear member 122 to the stationary member 164. Clutch 172 is selectively engagable to connect the interconnected carrier member 146 and ring gear member 124 for common rotation with ring gear member 144 and output member 117. Clutch 174 is selectively engagable to connect the carrier member 136 for common rotation with the ring gear member 144 and output member 117. Brake 176 is selectively engagable to ground the rotor 166B and the sun gear member 142 to the stationary member 164.

The transmission 114 is controllable to operate in various operating modes according to vehicle operating conditions under the control of a control system 180. The control system 180 includes a controller 182 that includes electronics such as a processor 184 on which a control algorithm is stored. The controller 182 is operatively connected to a power inverter 186 by a transfer conductor. The power inverter 186 in turn communicates with an electric storage device 188 via a transfer conductor. The electric storage device 188 may be one or more batteries but will be referred to herein as a battery. Other electric storage devices that have the ability to store electric power and dispense electric power may be used in place of the batteries.

Transfer conductors allow the power inverter 186 to provide the stored electric power to the motor/generator 160A and/or the motor/generator 160B in a motor mode, or transfer electric power from the motor/generator 160A and/or the motor/generator 160B to the electric storage device 188 in a generator mode. Additionally, the controller 182 communicates with a valve body 190 via transfer conductors to control selective engagement or disengagement of torque-transmitting mechanisms 170, 172, 174, and 176, as described below, via hydraulic fluid pressure, as is understood by those skilled in the art. In alternative embodiments, the torque-transmitting mechanisms 170, 172, 174 and 176 may be actuated electrically or otherwise. Connection of the valve body 190 to the torque-transmitting mechanisms 170, 172, 174, 176 is by various fluid passages in the valve body 190 and stationary member 164. Selective engagement of the torque-transmitting mechanisms 170, 172, 174, and 176 along with control of the speed and torque of the motor/generators 160A, 160B and engine 112 determines the operating mode of the powertrain 110.

The controller 182 receives a plurality of input signals 192, such as sensor signals from sensors (not shown) positioned to monitor the operation of the engine 112, the input member 116, the output member 117, vehicle wheels (not shown), and/or input signals from a vehicle operator, such as accelerator position. The input signals 192 correspond with vehicle operating conditions. The processor 184 processes the input signals 192 according to the stored algorithm 184 for the method of control, and provides control signals 194, 196 along transfer conductors in response to the input signals 192, as well as control signals to control the engine 112. The control signals 194, 196 establish the operating mode of the powertrain 110.

Control signals 194 to the inverter 186 cause the inverter 186 to provide electrical current from the energy storage device 188 to one or both of the motor/generators 162A, 162B, or may cause electrical current from the stators 162A and/or 162B to be stored in the energy storage device 188. Control signals 196 to the valve body 190 control the movement of electro-hydraulic valves (not shown, but as are known to those skilled in the art) within the valve body 190 that regulate hydraulic pressure to the torque-transmitting mechanisms 170, 172, 174 and 176 to control engagement thereof.

FIG. 4 shows the engagement schedule of the torque-transmitting mechanisms 170, 172, 174 and 176 to establish six different operating modes of the powertrain 110 as shown. The engagement schedule for three electrically-variable operating modes, EVT-1, EVT-2, and EVT-3, as well as three fixed operating modes, Fixed 1, Fixed 2 and Fixed 3 is shown. Establishment of these six operating modes is according to the method 300 of FIG. 7, as described above with respect to FIG. 1.

To establish the electrically-variable operating mode EVT-1, clutch 174 is engaged, the engine 112 is on, motor/generator 160A is controlled to operate as a generator, motor/generator 160B is controlled to operate as a motor, and torque is multiplied through the planetary gear set 130, 140.

To establish the electrically-variable operating mode EVT-2, clutch 172 is engaged, the engine 112 is on, motor/generator 160A is controlled to operate as a generator, and motor/generator 160B is controlled to operate as a motor. Engagement of clutch 172 causes all elements of planetary gearing arrangement 140 to be locked together for rotation at the same speed as the interconnecting member 150 and the output member 117.

To establish the electrically-variable operating mode EVT-3, brake 176 is engaged, the engine 112 is on, motor/generator 160B is controlled to operate as a generator, supplying electric power to energy storage device 188 through the control system 180. The stored power is supplied to motor/generator 160A, which is controlled to function as a motor.

The electrically-variable operating mode EVT-1 is appropriate for a range of relatively high-output torque, low vehicle speed operating conditions, the electrically-variable operating mode EVT-2 is appropriate for a range of relatively lower-output torque, higher vehicle speed operating conditions, and the electrically-variable operating mode EVT-3 is appropriate for even lower-output torque, higher vehicle speed operating conditions. Thus, the controller 182 may determine based on input signals 192 that vehicle operating conditions warrant shifting from EVT-1 to EVT-2 and then to EVT-3 as vehicle speed increases, and will send appropriate control signals 196 to the valve body 190 to establish such a succession of modes.

Input signals 192 received by the controller 182 and processed according to algorithm 184 may result in control signals 196 that implement one of the three available fixed ratio modes FIXED 1, FIXED 2, or FIXED 3.

To establish the fixed ratio operating mode FIXED 1, clutch 174 and brake 170 are engaged. Thus, motor/generator 160A is grounded, and a fixed ratio is established. Motor/generator 160B is off and free-wheels at a rotational speed proportional to that of the engine 112. Torque is multiplied through the second and third planetary gear sets 130, 140 to the output member 117. The first fixed ratio mode FIXED 1 may be established by engaging brake 170 during the electrically-variable EVT-1 mode, or may be established from vehicle rest. If vehicle operating conditions warrant during the first fixed mode FIXED 1, motor/generator 160B may be controlled to operate as a generator for regenerative braking, or as a motor to add torque, thus establishing a simple parallel hybrid operating mode in which the speed of the rotor 166A is proportional to the speed of the engine 112.

To establish the second fixed ratio operating mode FIXED 2, brake 170 and clutch 172 are engaged. Thus, motor/generator 160A is grounded and off, and a fixed ratio is established. Motor/generator 160B is off and free-wheels at a rotational speed proportional to that of the engine 112. The second fixed mode FIXED 2 may be established by engaging brake 170 during the electrically-variable EVT-2 mode. If vehicle operating conditions warrant during the fixed mode FIXED 2, motor/generator 160B may be controlled to operate as a generator for regenerative braking, or as a motor to add torque, thus establishing a simple parallel hybrid operating mode in which the speed of the rotor 166A is proportional to the speed of the engine 112.

To establish the third fixed ratio operating mode FIXED 3, brakes 170 and 176 are engaged. Thus, the planetary gear sets 130 and 140 are locked so that ring gears 134, 144 and carrier members 136 and 146 rotate at the same speed, both motor/generators 160A and 160B are off with rotors 166A, 166B stationary, and a fixed ratio is established. The FIXED 3 mode may be established by engaging brake 170 during the electrically-variable EVT-3 mode.

Figures 6, 7:
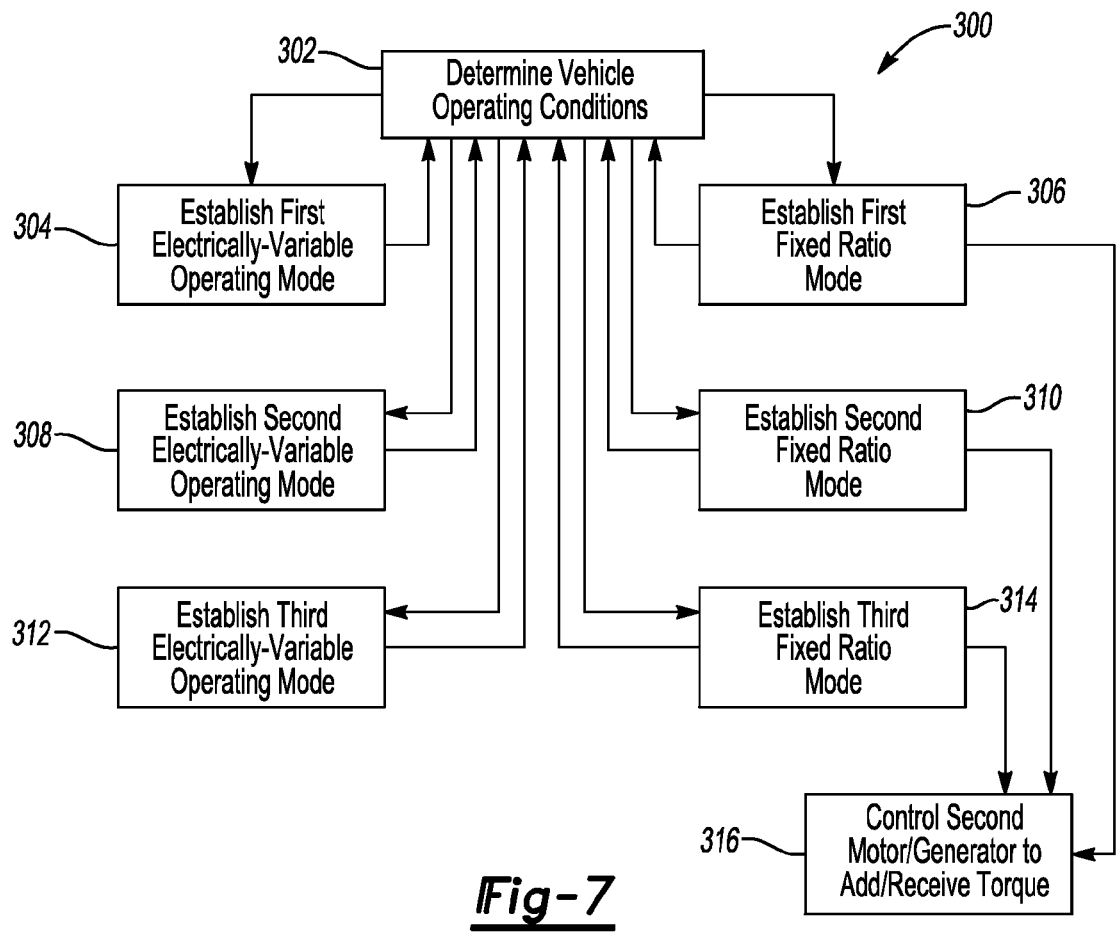
FIG. 6 is a chart showing an engagement schedule of torque-transmitting mechanisms of the transmission of FIG. 5 to establish various different operating modes.
FIG. 7 is a flow chart of a method of operating a hybrid powertrain, such as the powertrains of FIGS. 1, 3 and 5.

The powertrain 110 of FIG. 3 is controllable according to the method 300 of FIG. 7 in the same manner as described with respect to the embodiment of FIG. 1, with the engagement schedule of FIG. 4.

Third Embodiment

Figure 5:
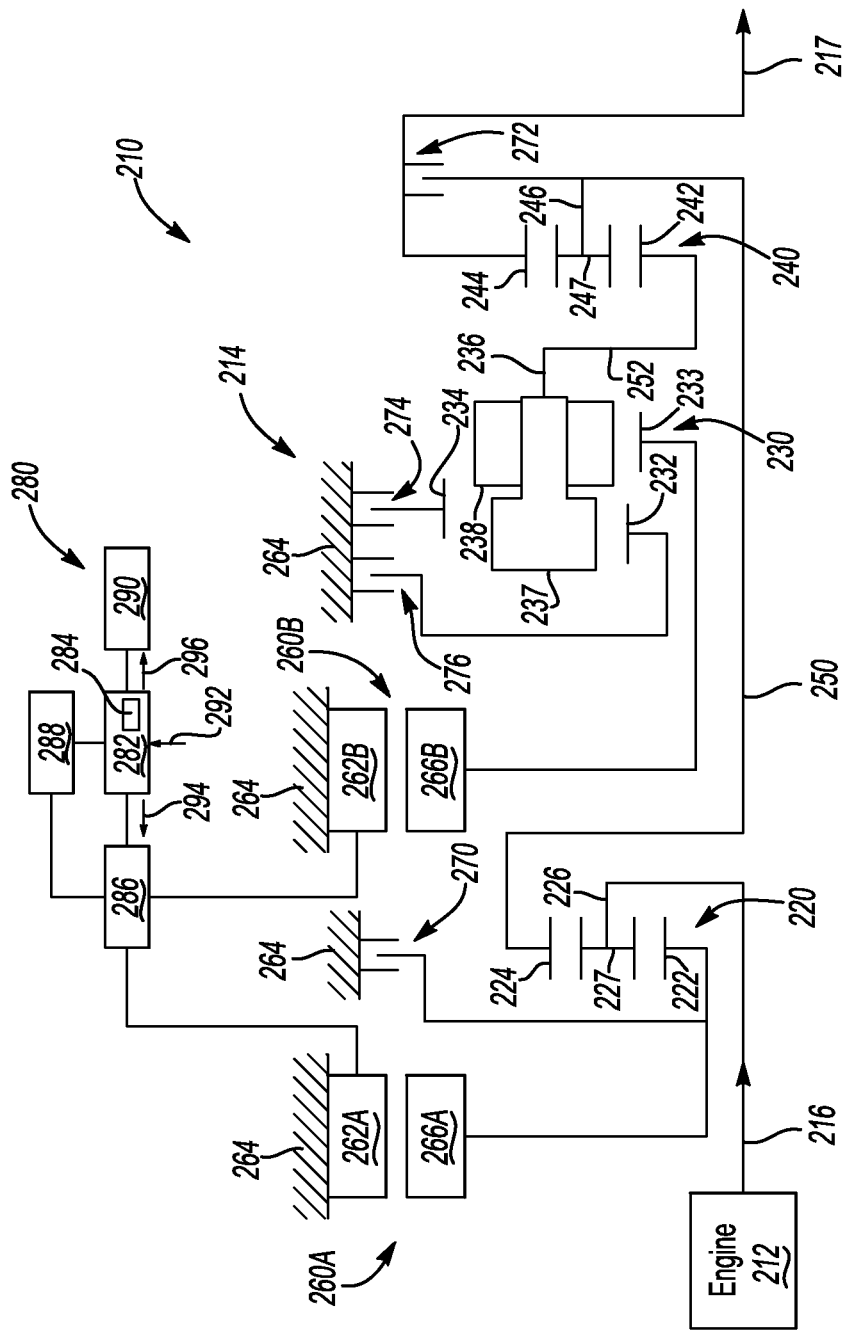
FIG. 5 is a schematic illustration of a third embodiment of a powertrain with a hybrid transmission.

Referring to FIG. 5, another embodiment of a hybrid powertrain 210 has an engine 212 connected with a hybrid transmission 214. The engine 212 has an output member, such as a crankshaft, connected for driving an input member 216 of the transmission 214, which may be via a damping mechanism, a torque converter, or other known connection.

The transmission 214 includes a first planetary gearing arrangement 220, a second planetary gearing arrangement 230, and a third planetary gearing arrangement 240. The first planetary gearing arrangement 220 is a simple planetary gear set having a sun gear member 222, a ring gear member 224, and a carrier member 226 rotatably supporting a plurality of pinion gears 227 that mesh with both the sun gear member 222 and the ring gear member 224.

The second planetary gear set 230 is a compound planetary gear set having a sun gear member 232, a sun gear member 233, a ring gear member 234, a first set of pinions 237 and a second set of pinions 238. The first set of pinions 237 meshes with the sun gear member 232 and with the second set of pinions 238. Pinions 237 are stepped pinions. The second set of pinions 238 meshes with the sun gear member 233 and the ring gear member 234.

The third planetary gear set 240 is a simple planetary gear set having a sun gear member 242, a ring gear member 244, and a carrier member 246 rotatably supporting a plurality of pinion gears 247 that mesh with both the ring gear member 244 and the sun gear member 242. An interconnecting member 250 connects ring gear member 224 for common rotation with carrier member 246. An interconnecting member 252 connects carrier member 236 for common rotation with sun gear member 242.

The transmission 214 includes a first motor/generator 260A and a second motor generator 260B. The first motor generator 260A includes a stator 262A grounded to stationary member 264, such as a transmission casing. The stationary member 264 is considered stationary as it is a nonrotating member of the transmission 214. Motor/generator 260A also includes a rotor 266A configured to be rotatably driven when the stator 262A is energized, and configured to generate electrical energy in the stator 262A when the motor/generator 260A is controlled to operate as a generator. The rotor 266A is continuously connected for rotation with the sun gear member 222.

Similarly, the motor/generator 260B also includes a rotor 266B configured to be rotatably driven when the stator 262B is energized, and configured to generate electrical energy in the stator 262B when the motor/generator 260B is controlled to operate as a generator. The rotor 266B is continuously connected for rotation with the sun gear member 233.

The transmission 214 also includes selectively engagable torque-transmitting mechanisms, including a first torque-transmitting mechanism, brake 270, a second torque-transmitting mechanism, clutch 272, a third torque-transmitting mechanism, brake 274, and a fourth torque-transmitting mechanism, brake 276. The torque-transmitting mechanisms may be friction plate-type brakes and clutches engagable via hydraulic pressure, but are not limited to such. Brake 270 is selectively engagable to ground the rotor 266A of motor/generator 260A and the sun gear member 222 to the stationary member 264. Clutch 272 is selectively engagable to connect the interconnected carrier member 246 and ring gear member 224 for common rotation with ring gear member 244 and output member 217. Brake 274 is selectively engagable to ground the ring gear member 234 to the stationary member 264. Brake 276 is selectively engagable to ground the sun gear member 232 to the stationary member 264.

The transmission 214 is controllable to operate in various operating modes according to vehicle operating conditions under the control of a control system 280. The control system 280 includes a controller 282 that includes electronics such as a processor 284 on which a control algorithm is stored. The controller 282 is operatively connected to a power inverter 286 by a transfer conductor. The power inverter 286 in turn communicates with an electric storage device 288 via a transfer conductor. The electric storage device 288 may be one or more batteries but will be referred to herein as a battery. Other electric storage devices that have the ability to store electric power and dispense electric power may be used in place of the batteries.

Transfer conductors allow the power inverter 286 to provide the stored electric power to the motor/generator 260A and/or the motor/generator 260B in a motor mode, or transfer electric power from the motor/generator 260A and/or the motor/generator 260B to the electric storage device 288 in a generator mode. Additionally, the controller 282 communicates with a valve body 290 via transfer conductors to control selective engagement or disengagement of torque-transmitting mechanisms 270, 272, 274, and 276, as described below, via hydraulic fluid pressure, as is understood by those skilled in the art. In alternative embodiments, the torque-transmitting mechanisms 270, 272, 274 and 276 may be actuated electrically or otherwise. Connection of the valve body 290 to the torque-transmitting mechanisms 270, 272, 274, 276 is by various fluid passages in the valve body 290 and stationary member 264. Selective engagement of the torque-transmitting mechanisms 270, 272, 274, and 276 along with control of the speed and torque of the motor/generators 260A, 260B and engine 212 determines the operating mode of the powertrain 210.

The controller 282 receives a plurality of input signals 292, such as sensor signals from sensors (not shown) positioned to monitor the operation of the engine 212, the input member 216, the output member 217, vehicle wheels (not shown), and/or input signals from a vehicle operator, such as accelerator position. The input signals 292 correspond with vehicle operating conditions. The processor 284 processes the input signals 292 according to the algorithm for the method of control, and provides control signals 294, 296 along transfer conductors in response to the input signals 292, as well as control signals to control the engine 212. The control signals 294, 296 establish the operating mode of the powertrain 210.

Control signals 294 to the inverter 286 cause the inverter 286 to provide electrical current from the energy storage device 288 to one or both of the motor/generators 260A, 260B, or may cause electrical current from the stators 262A and/or 262B to be stored in the energy storage device 288. Control signals 296 to the valve body 290 control the movement of electro-hydraulic valves (not shown, but as are known to those skilled in the art) within the valve body 290 that regulate hydraulic pressure to the torque-transmitting mechanisms 270, 272, 274 and 276 to control engagement thereof. Control signals to the engine control the on/off status as well as speed of the engine 212.

FIG. 6 shows the engagement schedule of the torque-transmitting mechanisms 270, 272, 274 and 276 to establish six different operating modes of the powertrain 210. The engagement schedule for three electrically-variable operating modes, EVT-1, EVT-2, and EVT-3, as well as three fixed operating modes, Fixed 1, Fixed 2 and Fixed 3 is shown. Establishment of these six operating modes is according to the method 300 of FIG. 7, which is described above with respect to the transmission 14 of FIG. 1.

To establish the electrically-variable operating mode EVT-1, clutch 272 and brake 274 are engaged, the engine 212 is on, and motor/generator 260A is controlled to operate as a generator, establishing an input-split operating mode. Motor/generator 260B is controlled to operate as a motor, and torque is multiplied through the planetary gear sets 230 and 240.

To establish the electrically-variable operating mode EVT-2, clutch 272 and brake 276 are engaged, the engine 212 is on, motor/generator 260A is controlled to operate as a generator, and motor/generator 260B is controlled to operate as a motor. Engagement of clutch 272 causes all elements of planetary gearing arrangement 240 to be locked together for rotation at the same speed as the interconnecting member 250 and the output member 217.

To establish the electrically-variable operating mode EVT-3, brakes 274 and 276 is engaged, the engine 212 is on, and motor/generator 260B is controlled to operate as a generator, supplying electric power to energy storage device 288 through the control system 280. The stored power is supplied to motor/generator 260A, which is controlled to function as a motor.

The electrically-variable operating mode EVT-1 is appropriate for a range of relatively high-output torque, low vehicle speed operating conditions, the electrically-variable operating mode EVT-2 is appropriate for a range of relatively lower-output torque, higher vehicle speed operating conditions, and the electrically-variable operating mode EVT-3 is appropriate for even lower-output torque, higher vehicle speed operating conditions. Thus, the controller 282 may determine based on input signals 292 that vehicle operating conditions warrant shifting from EVT-1 to EVT-2 and then to EVT-3 as vehicle speed increases, and will send appropriate control signals 296 to the valve body 290 to establish such a succession of modes.

Input signals 292 received by the controller 282 and processed according to algorithm 284 may result in control signals 296 that implement one of the three available fixed ratio modes FIXED 1, FIXED 2, or FIXED 3.

To establish the fixed ratio operating mode FIXED 1, clutch 272 and brakes 270 and 274 are engaged. Thus, motor/generator 260A is grounded, and a fixed ratio is established. Motor/generator 260A is off. Motor/generator 260B is off and free-wheels at a rotational speed proportional to that of the engine 212. Torque is provided through the second and third planetary gear sets 230, 240 to the output member 217. The first fixed ratio mode FIXED 1 may be established by engaging brake 270 during the electrically-variable EVT-1 mode, or may be established from vehicle rest. If vehicle operating conditions warrant, during the first fixed mode FIXED 1, motor/generator 260B may be controlled to operate as a generator for regenerative braking, or as a motor to add torque, thus establishing a simple parallel hybrid operating mode in which the speed of rotor 266B is proportional to the speed of the engine 212.

To establish the second fixed ratio operating mode FIXED 2, brakes 270 and 276 and clutch 272 are engaged. Thus, motor/generator 260A is grounded, and a fixed ratio is established through the gear sets 220, 230 and 240. Gear set 240 is locked with all members rotating at the same speed as the output member 217, the interconnecting member 250 and the ring gear member 224. Motor/generator 260B is off and rotor 266B free-wheels at the rotation speed of sun gear member 233, a fixed rate with respect to engine speed. The second fixed mode FIXED 2 may be established by engaging brake 270 during the electrically-variable EVT-2 mode. If vehicle operating conditions warrant during the fixed mode FIXED 2, motor/generator 260B may be controlled to operate as a generator for regenerative braking, or as a motor to add torque, thus establishing a simple parallel hybrid operating mode in which the speed of rotor 266B is proportional to the speed of the engine 212.

To establish the third fixed ratio operating mode FIXED 3, brakes 270, 274 and clutch 276 are engaged. Thus, the planetary gear sets 230 and 240 are locked for rotation at the same speed, both motor/generators 260A and 260B are off, and a fixed ratio is established through gear set 220. The FIXED 3 mode may be established by engaging brake 270 during the electrically-variable EVT-3 mode.

The powertrain 210 of FIG. 5 is controllable according to the method 300 of FIG. 7 in the same manner as described with respect to the embodiment of FIG. 1, with the engagement schedule of FIG. 6.

While the best modes for carrying out the invention have been described in detail, those familiar with the art to which this invention relates will recognize various alternative designs and embodiments for practicing the invention within the scope of the appended claims.

The invention claimed is:

1. A method of operating a hybrid powertrain; wherein the hybrid powertrain includes an engine and a transmission; wherein the transmission has an input member connected with the engine, an output member, a stationary member, a first and a second motor/generator, a first planetary gearing arrangement, and a second planetary gearing arrangement; wherein the input member is connected for common rotation with a first member of the first planetary gearing arrangement; wherein the output member is connected for common rotation with a first member of the second planetary gearing arrangement; wherein the first motor/generator is connected for common rotation with a second member of the first planetary gearing arrangement; wherein the second motor/generator is connected for common rotation with a second member of the second planetary gearing arrangement; an interconnecting member continuously connecting a third member of the first planetary gearing arrangement for common rotation with a third member of the second planetary gearing arrangement; a plurality of torque-transmitting mechanisms including a first torque-transmitting mechanism selectively engagable to ground the first motor/generator to the stationary member, a second torque-transmitting mechanism selectively engagable to connect the interconnecting member for common rotation with the output member, a third torque-transmitting mechanism and a fourth torque-transmitting mechanism, the third and fourth torque-transmitting mechanisms being selectively engagable to connect different members of the second planetary gearing arrangement to the stationary member or for common rotation with one another; the method comprising:
   establishing three different electrically-variable operating modes by engaging only one respective different one of the second, third and fourth torque-transmitting mechanisms in response to different respective vehicle operating conditions;
   establishing at least two different fixed ratio modes by engaging the first torque-transmitting mechanism in addition to said only one respective different one of the second, third and fourth torque-transmitting mechanisms engaged to establish the electrically-variable operating modes; wherein the at least two different fixed ratio modes are established in response to different respective vehicle operating conditions requiring greater torque at the output member than the respective different vehicle operating conditions of the electrically-variable operating modes.

2. The method of claim 1, further comprising:
   during at least one of said established fixed ratio modes, establishing a parallel hybrid operating mode by controlling the second motor/generator to function as one of a motor to add torque and a generator to receive torque for regenerative braking.

3. The method of claim 1, wherein the first planetary gearing arrangement is a simple planetary gear set; wherein the first member of the first planetary gear set is a carrier member, the second member of the first planetary gear set is a sun gear member, and the third member of the first planetary gear set is a ring gear member;
   wherein the second planetary gear set is a compound planetary gear set having a single ring gear member, first and second sun gear members, a carrier member and first and second sets of pinion gears; wherein the first member of the second planetary gear set is the single ring gear member, the second member of the second planetary gear set is a first of the two sun gear members, the third member of the second planetary gear set is the carrier member that rotatably supports the first set of pinion gears meshing with the first sun gear member and the single ring gear member and rotatably supports the second set of pinion gears meshing with the first set of pinion gears and the second sun gear member;
   wherein the third torque-transmitting mechanism is selectively engagable to ground the first sun gear member to the stationary member, and the fourth torque-transmitting mechanism is selectively engagable to ground the second sun gear member to the stationary member.

4. The method of claim 1, wherein the first planetary gearing arrangement is a first simple planetary gear set; wherein the first member of the first simple planetary gear set is a carrier member, the second member of the first simple planetary gear set is a sun gear member, and the third member of the first simple planetary gear set is a ring gear member;
   wherein the second planetary gearing arrangement includes a second compound planetary gear set and a third simple planetary gear set; wherein the second compound planetary gear set has a single ring gear member, first and second sun gear members, a carrier member and first and second sets of pinion gears, wherein the first set of pinion gears meshes with the first sun gear member and the single ring gear member, wherein the second set of pinion gears meshes with the first set of pinion gears and the second sun gear member; wherein the third simple planetary gear set has a ring gear member, a sun gear member, and a carrier member rotatably supports a set of pinion gears that meshes with the sun gear member and the ring gear member; wherein the first member of the second planetary gearing arrangement is the ring gear member of the third planetary gear set, the second member of the second planetary gearing arrangement is the first sun gear member of the second compound planetary gear set, the third member of the second planetary gearing arrangement is the carrier member of the third planetary gear set;
   wherein the third torque-transmitting mechanism is selectively engagable to ground the ring gear member of the second compound planetary gear set to the stationary member, and the fourth torque-transmitting mechanism is selectively engagable to ground the second sun gear member of the second compound planetary gear set to the stationary member; and wherein another interconnecting member connects the carrier member of the second compound planetary gear set for common rotation with the sun gear member of the third planetary gear set.

5. The method of claim 1, wherein the first planetary gearing arrangement is a simple planetary gear set; wherein the first member of the first planetary gear set is a carrier member, the second member of the first planetary gear set is a sun gear member, and the third member of the first planetary gear set is a ring gear member;
   wherein the second planetary gearing arrangement includes a second and a third simple planetary gear set, each having a ring gear member, a sun gear member, and a carrier member that rotatably support a set of pinion gears that meshes with the sun gear member and the ring gear member; wherein the first member of the second planetary gearing arrangement is the ring gear member of the third planetary gear set, the second member of the second planetary gearing arrangement is the sun gear member of the third planetary gear set, the third member of the second planetary gearing arrangement is the carrier member of the third planetary gear set;
wherein the third torque-transmitting mechanism is selectively engagable to ground the sun gear member of the third planetary gear set to the stationary member, and the fourth torque-transmitting mechanism is selectively engagable to connect the carrier member of the second planetary gear set for common rotation with the ring gear member of the third planetary gear set; and wherein another interconnecting member connects the ring gear member of the second planetary gear set for common rotation with the carrier member of the third planetary gear set.

6. The method of claim 1, wherein the first planetary gearing arrangement is a first simple planetary gear set; wherein the second planetary gearing arrangement is a second simple planetary gear set and a third simple planetary gear set.

7. The method of claim 1, wherein the three different electrically-variable operating modes are forward operating modes; and
wherein said at least two different fixed ratio operating modes are forward operating modes.

8. The method of claim 1, wherein said plurality of torque-transmitting mechanisms includes only the first, the second, the third, and the fourth torque-transmitting mechanisms.

9. A method of operating a hybrid powertrain; wherein the hybrid powertrain includes an engine and a transmission; wherein the transmission has an input member connected with the engine, an output member, a stationary member, a first and a second motor/generator, a first planetary gearing arrangement, and a second planetary gearing arrangement; wherein the input member is continuously connected for common rotation with a first member of the first planetary gearing arrangement; wherein the output member is continuously connected for common rotation with a first member of the second planetary gearing arrangement; wherein the first motor/generator is continuously connected for common rotation with a second member of the first planetary gearing arrangement; wherein the second motor/generator is continuously connected for common rotation with a second member of the second planetary gearing arrangement; an interconnecting member continuously connecting a third member of the first planetary gearing arrangement for common rotation with a third member of the second planetary gearing arrangement; only four torque-transmitting mechanisms including a first torque-transmitting mechanism selectively engagable to ground the first motor/generator to the stationary member, a second torque-transmitting mechanism selectively engagable to connect the interconnecting member for common rotation with the output member, a third torque-transmitting mechanism and a fourth torque-transmitting mechanism, the third and fourth torque-transmitting mechanisms being selectively engagable to connect different members of the second planetary gearing arrangement to the stationary member or for common rotation with one another; the method comprising:
establishing three different electrically-variable operating modes by engaging only one respective different one of the second, third and fourth torque-transmitting mechanisms in response to different respective vehicle operating conditions;
establishing at least two different fixed ratio modes by engaging the first torque-transmitting mechanism in addition to said only one respective different one of the second, third and fourth torque-transmitting mechanisms engaged to establish the electrically-variable operating modes; wherein the at least two different fixed ratio modes are established in response to different respective vehicle operating conditions requiring greater torque at the output member than the respective different vehicle operating conditions of the electrically-variable operating modes.

10. The method of claim 9, wherein the first planetary gearing arrangement is a simple planetary gear set; wherein the first member of the first planetary gear set is a carrier member, the second member of the first planetary gear set is a sun gear member, and the third member of the first planetary gear set is a ring gear member;
wherein the second planetary gearing arrangement includes a second and a third simple planetary gear set, each having a ring gear member, a sun gear member, and a carrier member that rotatably support a set of pinion gears that meshes with the sun gear member and the ring gear member; wherein the first member of the second planetary gearing arrangement is the ring gear member of the third planetary gear set, the second member of the second planetary gearing arrangement is the sun gear member of the third planetary gear set, the third member of the second planetary gearing arrangement is the carrier member of the third planetary gear set;
wherein the third torque-transmitting mechanism is selectively engagable to ground the sun gear member of the third planetary gear set to the stationary member, and the fourth torque-transmitting mechanism is selectively engagable to connect the carrier member of the second planetary gear set for common rotation with the ring gear member of the third planetary gear set; and wherein another interconnecting member connects the ring gear member of the second planetary gear set for common rotation with the carrier member of the third planetary gear set.

11. The method of claim 9, wherein the first planetary gearing arrangement is a first simple planetary gear set; wherein the second planetary gearing arrangement is a second simple planetary gear set and a third simple planetary gear set.

12. The method of claim 9, wherein the three different electrically-variable operating modes are forward operating modes; and
wherein said at least two different fixed ratio operating modes are forward operating modes.

13. The method of claim 9, wherein said at least two different fixed ratio operating modes includes three different fixed ratio operating modes that are each established by engaging the first torque-transmitting mechanism in addition to said only one respective different one of the second, third and fourth torque-transmitting mechanisms.

* * * * *